(12) United States Patent
Gassmann

(10) Patent No.: US 7,156,766 B2
(45) Date of Patent: Jan. 2, 2007

(54) DIFFERENTIAL ASSEMBLY FOR CONTROLLING THE DISTRIBUTION OF TORQUE

(75) Inventor: Theodor Gassmann, Siegburg (DE)

(73) Assignee: GKN Driveline International GmbH (DE)

( * ) Notice: Subject to any disclaimer, the term of this patent is extended or adjusted under 35 U.S.C. 154(b) by 181 days.

(21) Appl. No.: 10/883,410

(22) Filed: Jul. 1, 2004

(65) Prior Publication Data

US 2005/0032599 A1    Feb. 10, 2005

(30) Foreign Application Priority Data

Jul. 1, 2003   (DE)  .................... 103 29 770

(51) Int. Cl.
*F16H 48/22* (2006.01)
(52) U.S. Cl. ..................... 475/249
(58) Field of Classification Search ............. 475/205, 475/248, 221, 223, 204, 249, 230, 231
See application file for complete search history.

(56) References Cited

U.S. PATENT DOCUMENTS

| | | | | |
|---|---|---|---|---|
| 5,454,762 A | * | 10/1995 | Sawase et al. ............ | 475/84 |
| 5,497,845 A | * | 3/1996 | Shibahata ................ | 180/76 |
| 6,296,590 B1 | | 10/2001 | Gassmann | |
| 6,851,537 B1 | * | 2/2005 | Bowen ................... | 192/84.6 |
| 2005/0159264 A1 | * | 7/2005 | Puiu et al. ............... | 475/198 |
| 2005/0197228 A1 | * | 9/2005 | Showalter ............... | 475/222 |

FOREIGN PATENT DOCUMENTS

| | | |
|---|---|---|
| DE | 44 18 891 A1 | 1/1995 |
| GB | 2182735 A * | 5/1987 |

\* cited by examiner

*Primary Examiner*—Sherry Estremsky

(57) ABSTRACT

A differential drive having an input element (E) and three output elements (A1, A2, A3), which, relative to one another, have a differential effect, and wherein there exists a fixed ratio between the transmittable input torque and each of the output torques directly transmittable to the output elements and wherein one of the output elements (A3), via at least one coupling (K1, K2), can be connected to each of the two other output elements (A1, A2).

29 Claims, 12 Drawing Sheets

DIFFERENTIAL ASSEMBLY FOR CONTROLLING THE DISTRIBUTION OF TORQUE

TECHNICAL FIELD

The invention relates to a differential drive, more particularly for being used in motor vehicles with a primarily driven driving axle and an optionally driven rear axle.

BACKGROUND OF THE INVENTION

From DE 44 18 891 C2 there is known a drive system for a motor vehicle, with a first and a second driven axle, which drive system comprises an engine-gearbox unit and an axle drive block of a first driving axle with two differential drive stages and an output leading to the second driving axle. The first differential drive stage distributes the torque supplied by the engine-gearbox unit between a first driveshaft of the first driving axle and the second differential drive stage, and the second differential drive stage distributes its input torque between the second driveshaft of the first driving axle and the output to the second driving axle. A fluid friction coupling can be effectively inserted between the two driven axles. A further differential drive is used in the second driving axle in the form of an axle differential of the conventional type.

U.S. Pat. No. 6,296,590 proposes differential drives for use in motor vehicles with a primarily driven driving axle and an optionally driven driving axle, by means of which differential drives the optionally drivable driving axle can be connected and disconnected and by means of which, within the connected driving axle, starting from the open differential function, an increasing locking effect can be generated.

SUMMARY OF THE INVENTION

The present invention provides a differential drive by means of which the distribution of torque between the wheels of a driven axle can be controlled independently of the rotational speed conditions and by means of which an optionally driven axle can be connected, if desired.

One embodiment of the present invention provides a differential drive having an input element E and three output elements A1, A2, A3 which relative to one another comprise a differential effect. There exists a fixed ratio between the input torque introduced via the input element E and each of the output torques directly transmittable to the output elements. Further, one of the output elements A3 can be connected via at least one coupling K1, K2 to each of the two other output elements A1, A2. More particularly, the couplings are controllable couplings which permit a variable distribution of the output torque of the third output element A3 to the two other output elements A1, A2. Thus, by varying the individual coupling torques of the couplings K1, K2, it is possible to vary the input torque transmittable to the input element E as well as the distribution of the input torque between the first one and the second one of the output elements A1, A2.

In another embodiment, the present invention provides a differential drive comprising a differential carrier which is rotatably supported and which is rotatingly drivable; a first differential drive set comprises the following members: a first input element, a first outlet part of the first set constituting a first output part, and a second outlet part of the first set. A second differential drive set comprises the following members: a second input element constituting a second outlet part of the first set, a first outlet part of the second set constituting a second output part, and a second outlet part of the second set constituting a third output part. A first controllable coupling is effective between the first output part and the third output part. A second controllable coupling is effective between the second output part and the third output part.

Furthermore, the present invention provides that the first differential drive set is a planetary drive wherein the differential carrier forms the web on which the planetary gears are rotatably supported, wherein there is provided a hollow gear and wherein the sun gear forms the first output part. It is advantageous for the first output part to be a hollow shaft in which there runs a shaft which is connected to the third output part.

Furthermore, the second differential drive set can be a planetary drive wherein there is provided a hollow gear, wherein the third output part forms the web on which planetary gears are rotatably supported and wherein the sun gear is firmly connected to the second output part. In this embodiment, it is advantageous if the web of the second planetary drive unit is connected to a hollow shaft in which there runs the second output part. The hollow gears of the two differential drive sets are connected to one another.

To achieve corresponding directions of rotation between the first and the second output part, the second differential drive set can be a double planetary drive wherein first planetary gears engage the hollow gear and second planetary gears engage the sun gear, wherein first and second planetary gears engage each other's teeth.

According to a first embodiment, the two multi-plate couplings are positioned outside the differential carrier. According to an alternative embodiment, it is possible for a first multi-plate coupling to be positioned inside the differential carrier and a second multi-plate coupling to be positioned outside the differential carrier. The differential carrier is normally supported in a drive housing which, at the same time, is able to accommodate the bearing of a driveshaft for the differential carrier.

Furthermore, the setting device for the multi-plate coupling can be provided in the form of a ball-ramp setting device. Such ball-ramp setting devices comprise two discs, one of which is held in the drive housing in a rotationally fast way and the other one is rotatingly drivable relative to the first one by a rotary motor. In the disc faces positioned opposite one another there are provided grooves with circumferentially variable depths which accommodate pairs of balls. One of the discs is axially supported in the drive housing and the other one is supported so as to be axially displaceable in the housing. When the rotatable disc is rotated relative to the disc held in a rotationally fast way, the displaceable disc is axially displaced relative to the disc supported in the housing and is thus able to axially load a coupling, so that the coupling plates of same are pressed together to permit a transmission of torque between two drive parts which can be connected to one another via the coupling.

In principle there is achieved a differential assembly with three output parts and one input part wherein two of the output parts are directly connected to the respective output shafts, i.e. more particularly sideshafts. The third output shaft which has to support a predetermined percentage of torque is connected via a controlled coupling assembly to one each of the output shafts. Within the framework of the given geometry of the differential assembly, it is possible, via the couplings, to transmit a different percentage of the input torque to the output shafts, i.e. independently of their rotational speeds. There has thus been achieved a controlled distribution of torque between the output shafts. There exists a fixed ratio between the input torque of the differential drive and the torque which is supported at the third output shaft via the couplings. The input torque of the differential drive can thus be controlled via the sum of the coupling torques. Both couplings act between the two output shafts in a so-called shaft-shaft assembly. By controlling the couplings it is thus possible to generate a transverse locking effect between the two sideshafts (wheels) which are connected to the first two output shafts. The two couplings thus control the entire torque transmittable by the differential drive, the distribution of the torque of the third output part to the two other output parts (sideshafts), and the locking effect between the first two output parts (sideshafts).

In principle, it is possible to use any possible drive assembly within a differential assembly which, while comprising one input element, comprises three output elements with a fixed torque ratio relative to one another.

One embodiment of such a drive assembly arranged inside the differential assembly includes a combination of a single planetary set and a double planetary set. The single planetary set permits the input torque to be divided between a first sun gear connected to a first sideshaft and a hollow gear, with the input torque being introduced via the planetary carrier of the single planetary set. From said hollow gear, the torque is again divided between the planetary carrier of the double planetary set and a second sun gear connected to the second sideshaft. The geometric conditions of the planetary gear sets should be selected to be such that the two sun gears support identical torque values and that the planetary carrier of the second planetary gear set supports a third percentage of torque. Two controlled couplings connect the planetary carrier of the second planetary gear set in the form of a third differential output to one each of the sideshafts, thus permitting a specific division of the third percentage of torque between the sideshafts.

If the differential assembly is arranged in a primarily driven axle, the division of the torque, via the couplings, between the wheels of the axle can be varied independently of their rotational speeds. If the inventive differential assembly is arranged in a so-called hang-on coupling in an optionally drivable axle, it is possible, via the couplings, to control both the entire torque transmitted to the axle and the division of the torque between the sideshafts.

Furthermore, the invention refers to motor vehicles which are provided with one or several differential drives of the above-described type in the way described below.

The first application provides a motor vehicle with a driving axle, wherein an engine-gearbox unit is connected to the input shaft of an inventive differential used as an axle drive in the driving axle. The driven driving axle can either be the front axle or the rear axle.

A further application provides a motor vehicle with two driving axles, wherein an engine-gearbox unit is connected to the input shaft of a locking central differential whose first output shaft is connected to a first driven axle and whose second output shaft is connected to a second driven axle. The inventive differential drive is used as an axle differential of the first driven axle and, for example, a further differential drive as the axle drive of the secondarily driven axle. The term "locking central differential" refers to a differential with a fixed locking rate or to a controllably lockable differential drive. The inventive differential drive allows varying of both the torque distribution between the primarily and secondarily driven axle as well as the distribution of the torque between the driveshafts of the primarily driven axle.

Yet a further application provides a motor vehicle with two driving axles, wherein an engine-gearbox unit is connected to an input shaft of a transfer box whose first output shaft is connected to a primarily driven axle and whose second output shaft is connected via a switchable coupling (hang-on coupling) to a secondarily driven axle. The inventive differential drive is used as an axle differential of at least one of the two driven axles and wherein, for example, a further differential drive is used as an axle drive of the other one of the two driven axles. The term "transfer box" refers to a distributing drive with a rotationally rigid connection between the two output shafts. In a configuration wherein the inventive differential drive of the primarily driven axle and a conventional further differential drive are associated with the secondary axle, the following applies. When the hang-on coupling is open, it is possible, via the inventive differential drive, to control both the torque to be transmitted to the primarily driven axle as well as the distribution of torque to the two driveshafts. If the hang-on coupling is closed, the inventive differential drive additionally controls the distribution of torque between the two driving axles. According to an alternative application, the inventive differential drive can also be used as an axle differential of the secondarily driven axle and a further differential drive can be used as an axle drive of the primarily driven axle.

The primarily driven axles in the two above-mentioned applications can be both the front axle and the rear axle, with the respective other axle having to be regarded as the secondarily driven axle.

A further application provides a motor vehicle with two driving axles, wherein an engine-gearbox unit is connected to the input shaft of a transfer box whose first output shaft is connected to a first driven axle and whose second output shaft is connected to a second driven axle. The inventive differential drive is used as an axle differential of the first driven axle and an identical inventive differential drive is used as an axle drive of the second driven axle. Whereas the transfer box, in this embodiment, specifies a rotationally rigid connection between the axles, it is possible, via the inventive differential drive, to control the torque taken from the respective axle and the distribution of said torque to the two driveshafts.

Finally, a further application provides a motor vehicle with two driving axles, wherein an engine-gearbox unit is connected to the input shaft of an inventive differential drive which is used as a central differential and whose first output shaft is connected to a first driven axle and whose second output shaft is connected to a second driven axle. A further differential drive is used as an axle differential in the first driven axle and as an axle differential in the second driven axle. The latter differential drives are normally of the conventional type, whereas the inventive differential drive used as a central differential is able, freely, to set the distribution of torque between the two driving axles.

In the two latter applications, no distinction is drawn between a primarily driven axle and a secondarily driven axle; the two driving axles are equal.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

In the following description, various operating parameters and components are described for several embodiments. These specific components and parameters are included as examples and are not meant to be limiting.

Figure 1:
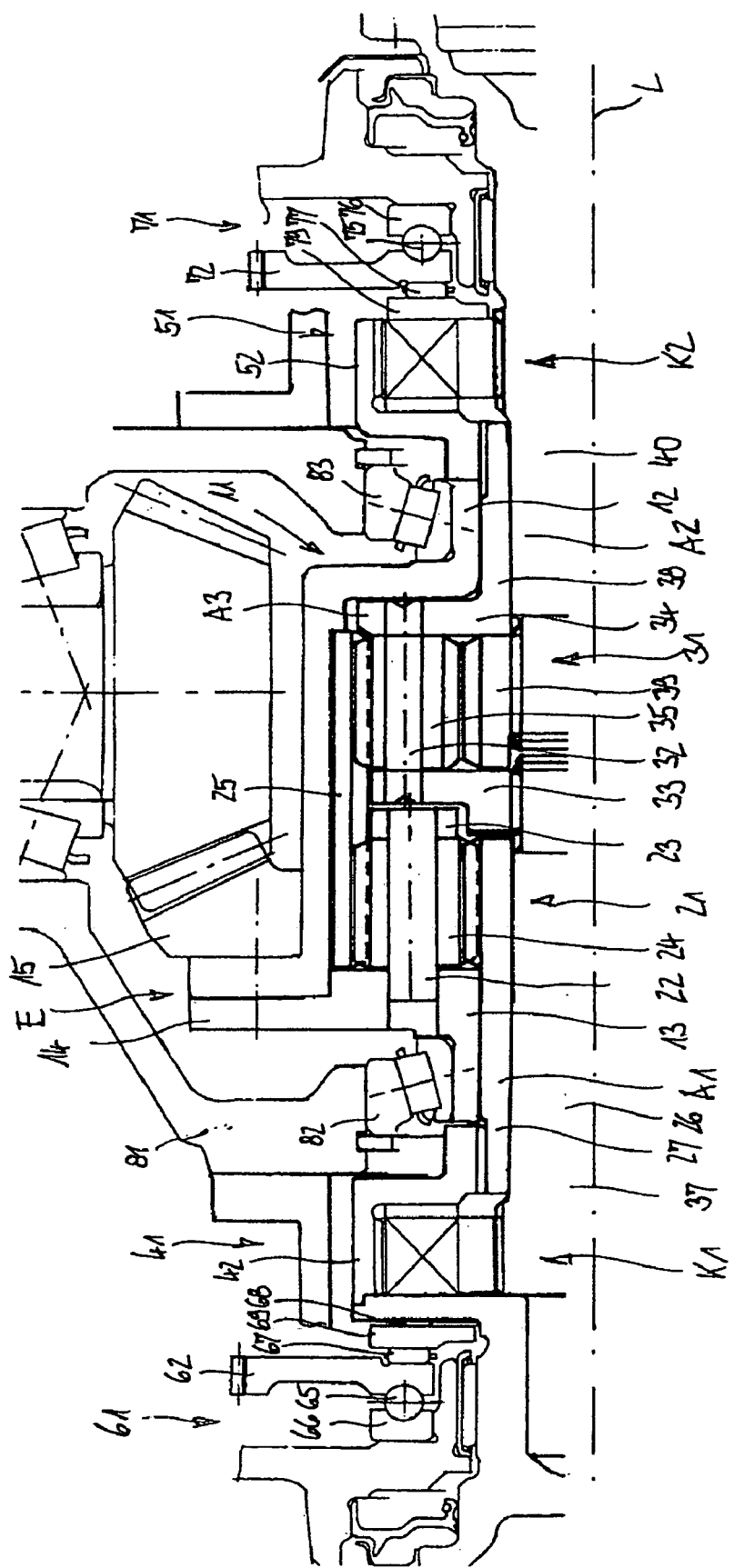
FIG. 1 is half a longitudinal section through an inventive differential drive in a first embodiment.

Referring now to the drawings wherein like reference numerals are used to identify like components in the various views but are indexed by 100, FIG. 1 shows the differential carrier 11 of an inventive differential drive. The differential carrier 11 is rotatably supported in a drive housing 81 in two angular contact roller bearings 82, 83 around the longitudinal axis L. The differential carrier 11 is also referred to as input part E. The differential carrier 11 includes a dish 12 and a cover 13 which are tensioned relative to one another by bolts 14. A crown wheel 15 via which the differential carrier is rotatingly drivable is bolted to the differential carrier 11. In the differential carrier 11, there is arranged a first differential drive set 21 which comprises the following components: A web of the drive set 21 is formed by the cover 13, a journal 22 and an annular part 23, with planetary gears 24 being rotatably supported on the journal 22. A plurality of journals and a plurality of planetary gears can be provided around the circumference of the drive. The planetary gears 24 engage a hollow gear 25 which extends along the length of the dish 12 and is held so as to be freely rotatable therein. Furthermore, the planetary gears 24 engage a sun gear 26 which is provided in the form of a hollow gear and changes integrally into a hollow shaft 27. The hollow shaft 27 has also been referred to as the first output part A1.

A second differential drive set 31 comprises a web which is composed of a journal 32 and two flanges 33, 34 and on which there are supported planetary gears 35. The teeth of the planetary gears 35 engage the teeth of the hollow gear 25. The web is referred to as the third output part A3. A shaft 37 supported in the hollow shaft 27 and being rotatable thereto is connected to the flange 33. The second differential drive 31, furthermore, comprises a sun gear 39 which engages further planetary gears (not shown) supported in the web. Furthermore, the teeth of the planetary gears 35 and those of the further planetary gears (not shown) engage one another. A shaft 40 referred to as the second output part A2 is inserted into the sun gear 39. The shaft 40 is positioned in the hollow shaft 38 and is rotatable relative thereto. The coupling carrier 42 of a multi-plate coupling 41 which carries outer plates of the coupling is connected to the shaft 27. Inner plates of the coupling are held on the shaft 37 of the third output part A3. The first multi-plate coupling 41 can be used to transmit torque between the shafts 37 and 27, i.e. between the third output part A3 and the first output part A1. The first multi-plate coupling 41 is also referenced in the Figure as K1. The first multi-plate coupling 41 is actuated via a first ball ramp mechanism 61 comprising a rotatingly drivable setting disc 62 which is supported via balls 65 on a further disc 66 which is supported in the housing 81 in a rotationally fast and axially supported way. The disc 62 acts via an axial bearing 67 on a disc 69 which, in turn, via pressure journals 68 passing through the coupling carrier 42 act on the plates of the first multi-plate coupling 41. The coupling carrier 52 of a second multi-plate coupling 51 carrying outer plates of said coupling is connected to the hollow shaft 38 of the third output part A3. The inner plates of the second multi-plate coupling 51 are directly connected to the shaft 40. The second multi-plate coupling 51 can be used to transmit torque between the shaft 38 and the shaft 40, i.e. between the third output part A3 and the second output part A2. The second multi-plate coupling 51 is also reference das K2. The second multi-plate coupling 51 is actuated via a second ball ramp mechanism 71 comprising a rotatingly drivable setting disc 72 which, via balls 75, is supported on a further disc 76 which is held in the housing 81 in a rotationally fast and axially supported way. The setting disc 72 acts via an axial bearing 77 and a pressure disc 79 on the plates of the multi-plate coupling 51. The balls of the two setting devices run in grooves with a circumferentially variable groove depth rising in opposite directions. By rotating the two discs 62, 66 and, respectively, 72, 76, the axial distance between the two discs is changed.

Figure 2:
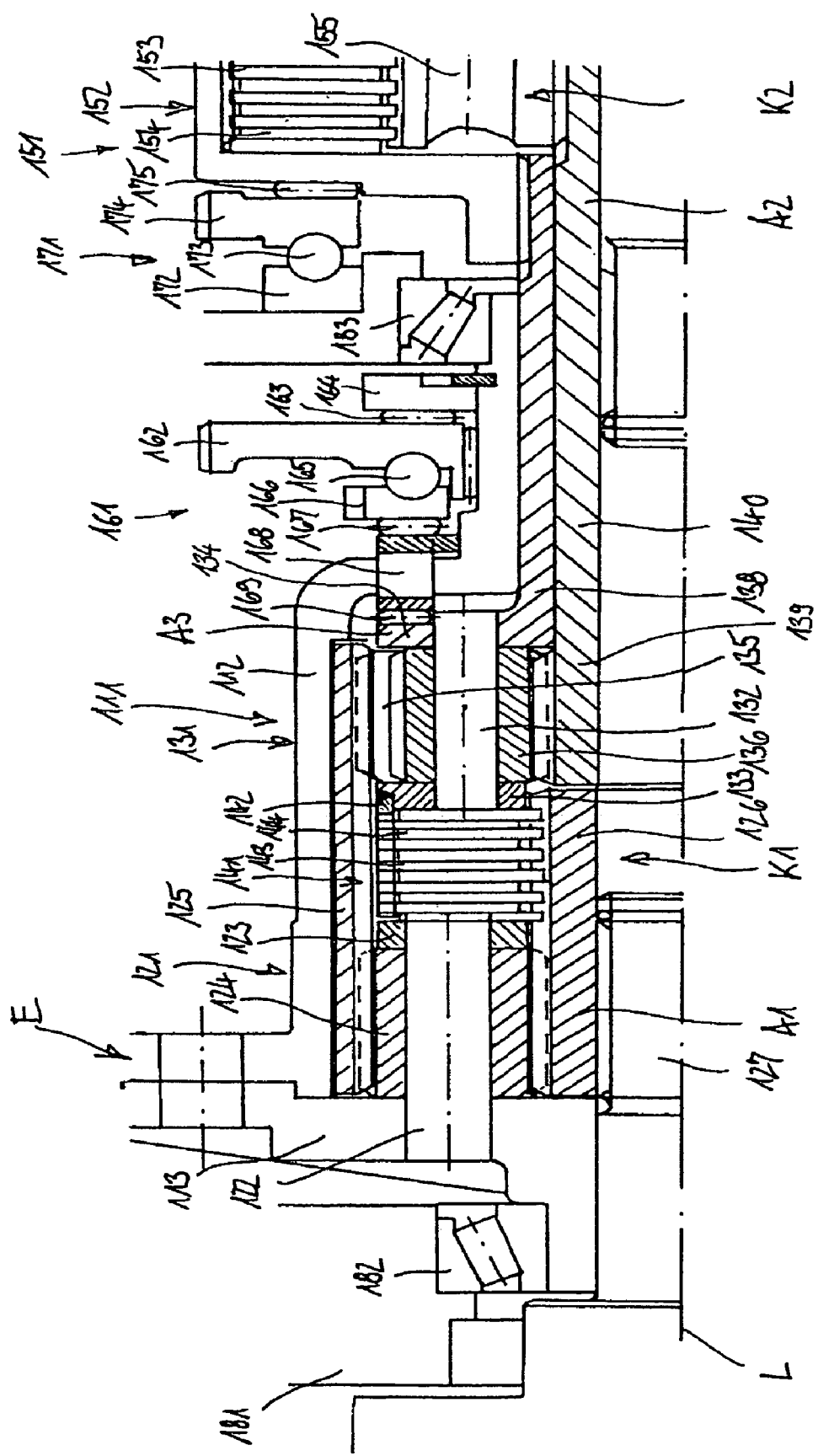
FIG. 2 is half a longitudinal section through an inventive differential drive in a second embodiment.

FIG. 2 shows the differential carrier 111 of a differential drive, with part of a drive housing 181 being visible. In said housing 181, the differential carrier 111 is supported via angular contact roller bearings 182, 183 in such a way that it is rotatable around a longitudinal axis L in the housing. The differential carrier has also been referred to as the input part E. The differential carrier includes a dish 112 and a cover 113. The means for rotatingly driving the differential carrier are not shown. A first differential gear set 121 comprises, in the form of a web, the cover 113, bearing journals 122 inserted into the latter, a ring or annular part 123 in which the bearing journals 122 are held jointly, as well as planetary gears 124. The planetary gears 124 engage a hollow gear 125 which extends over the length of the dish 112 and is rotatably supported therein. Furthermore, the first differential gear set comprises a sun gear 126 provided in the form of a hollow gear and into which there is inserted a solid shaft 127. In this embodiment, the sun gear 126 is referred to as the first output part A1.

A second differential gear set 131 comprises a web including bearing journals 132, a first annular part 133 and an annular flange 134. Planetary gears 136 engaging a sun gear 139 designed as a hollow gear are rotatably supported on the journals. Further planetary gears 135 engage the hollow gear 125, with the teeth of the planetary gears 135, 136 engaging one another. The web is referred to as the third output part A3. A hollow shaft 138 in which there is positioned a further hollow shaft 140 firmly connected to the sun gear 139 is firmly connected to the flange 134. The hollow shaft 140 is referred to as the second output part A2. A first multi-plate coupling 141 is positioned in the differential carrier between the annular members 123 and 133, with a coupling carrier 142 carrying outer plates 143 being connected with the latter. Inner plates 144 are connected to the sun gear 126 of the first differential drive set 121 in a rotationally fast way. By way of the first multi-plate coupling 141, it is thus possible to transmit torque of the third output unit A3 and of the first output shaft A1. The first multi-plate coupling 141 is also reference das K1. The first multi-plate coupling 141 is actuated via a first axial setting device in the form of a ball-ramp mechanism 161 comprising a rotatingly drivable setting disc 162 which, via an axial bearing 163, is supported on a disc 164 secured to the differential carrier 111. The setting disc 162 acts via balls 165 on a further pressure disc 166 which is held in the housing 181 in a rotationally fast way. The pressure disc 166 acts via an axial bearing 167 on pressure journals 168 which axially displace the web, i.e. the third output part A3 of the second differential drive unit 131 and thus axially load the first multi-plate coupling 141 which, via the web of the first differential gear unit 121, is supported on the differential carrier 111.

A second multi-plate coupling 151 comprises a coupling carrier 152 in which there are held outer plates 153 and which is secured on the hollow shaft 138 of the third output part A3, as well as a coupling hub 155 on which there are held inner plates 154. The coupling hub 155 is connected to the hollow shaft 140 in a rotationally fast way, so that the second multi-plate coupling 151 permits a transmission of torque from the third output part A3 to the second output part A2. The second multi-plate coupling 151 is also referenced as K2. The second multi-plate coupling 151 can be set by a second axial setting device 171 in the form of a ball-ramp assembly comprising a first axially fixed disc 172 which is supported on the housing 181 and which, in turn, via balls 173, supports a second rotatingly drivable setting disc 174 which, via an axial bearing 175, acts on the second multi-plate coupling 151.

The balls of the two setting devices 161, 171 run in grooves whose groove depth is circumferentially variable and rises in opposite directions. A rotation of the two discs 162, 166 and 172, 174 respectively changes the axial distance between the two discs relative to one another.

Figure 3:
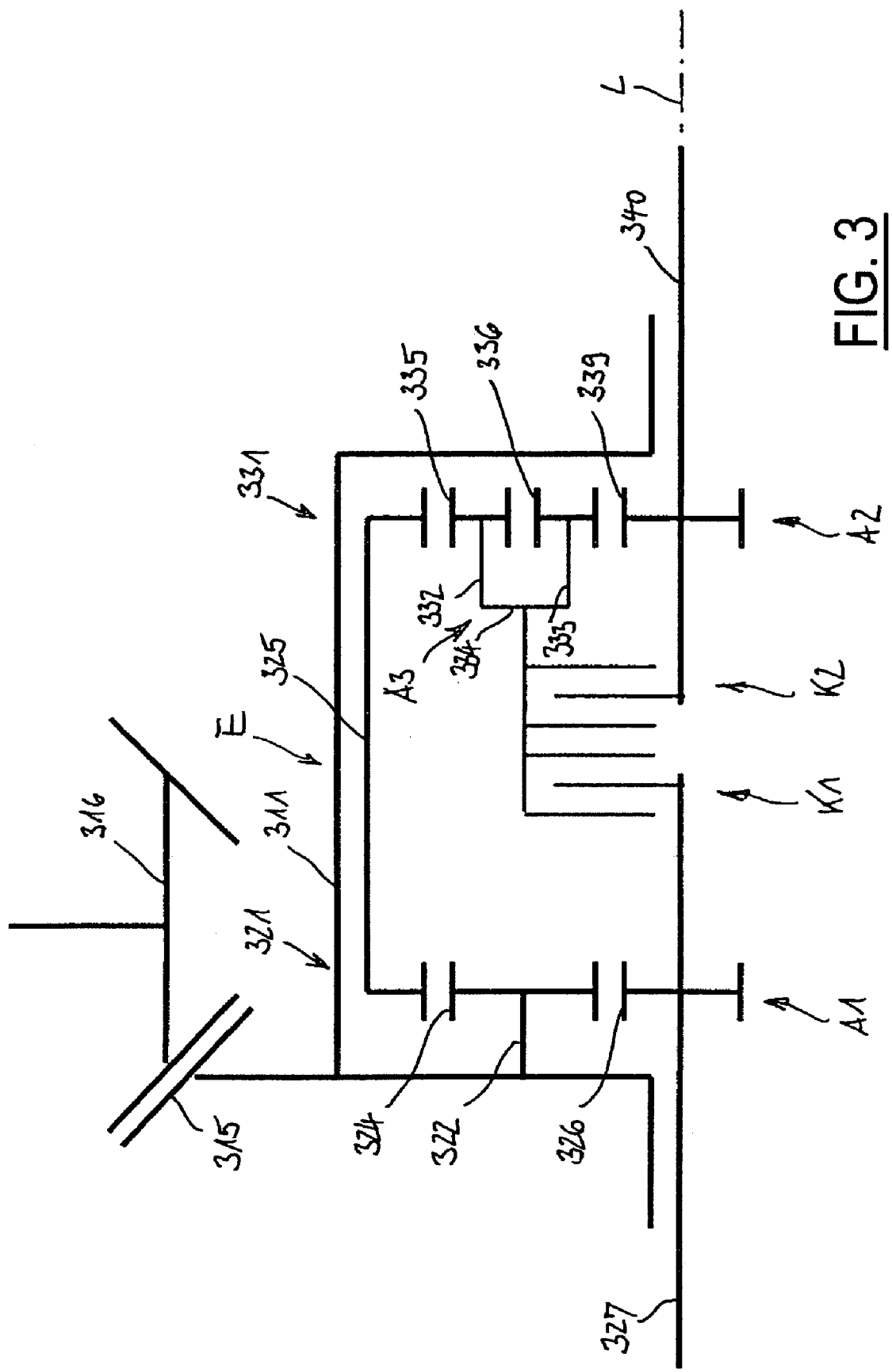
FIG. 3 is half a longitudinal section through an inventive differential drive in a third embodiment, in schematic form.

FIG. 3 shows the differential carrier 311 of a differential drive in a third embodiment in a schematic diagram showing the principles of operation. The differential carrier 311 is supported so as to be rotatable around a longitudinal axis L. The differential carrier 311 is also referred to as the input part E. A crown wheel 315 via which the differential carrier 311 can be driven by a driving pinion 316 is attached to the differential carrier 311. A first differential gear set 321 comprises the differential carrier 311 in the form of a web, bearing journals 322 inserted into same, as well as planetary gears 324 rotating on the bearing journals 322. The planetary gears 324 engage a hollow gear 325 which extends along the length of the differential carrier 311 and is rotatably supported therein. Furthermore, the first differential gear set 321 comprises a sun gear 326 which is shown in full and which is connected to a shaft 327. In this embodiment, the sun gear 326 is referred to as the first output part A1.

A second differential gear set 331 comprises a web including an annular part 334 and bearing journals 332, 333. On the bearing journals 332 there are rotatably supported first planetary gears 335 which engage the hollow gear 325. On the bearing journals 333, there are supported second planetary gears 336 which engage a sun gear 339 which is shown in full. In this embodiment, the planetary gears 335, 336 engage one another in pairs. The web is referred to as the third output part A3. A shaft 340 is firmly connected to the sun gear 339. The sun gear 339 is referred to as the second output part A2. A first multi-plate coupling K1 is positioned in the differential carrier 311 and is effective between the third output part A3 and the first output part A1. By means of the first multi-plate coupling K1 it is thus possible to transmit torque from the third output part A3 to the first output part A1. A second multi-plate coupling K2 is positioned in the differential carrier 311 and is effective between the third output part A3 and the second output part A2, so that by means of the second multi-plate coupling K2 it is possible to transmit torque from the third output part A3 to the second output part A2.

Figure 4B:
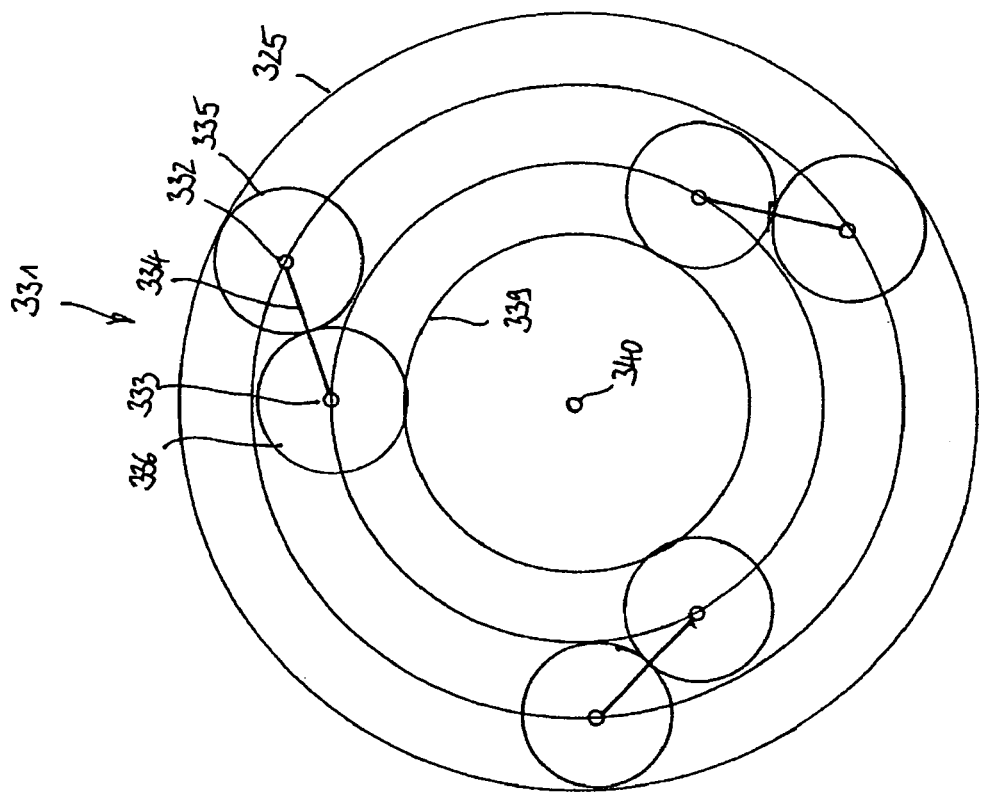
FIG. 4 shows the differential drive according to FIG. 3:
A) in a cross-section through a planetary gear drive set; and
B) in a cross-section through a double planetary gear drive set.
Figure 4A:
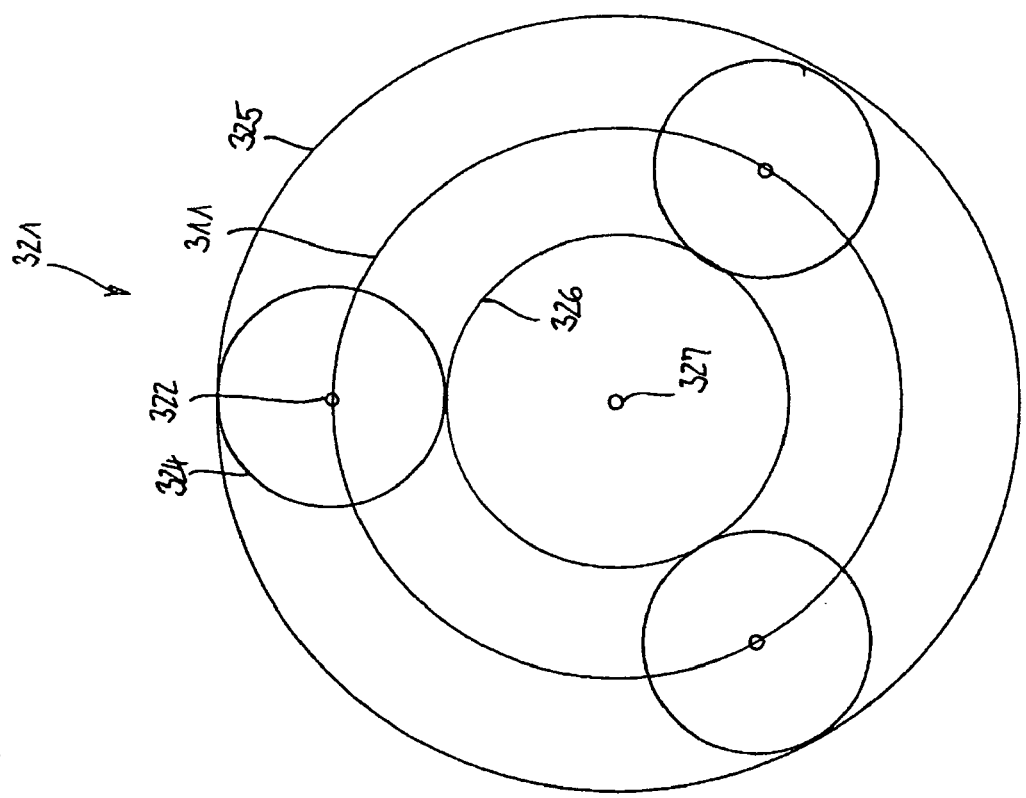

FIG. 4A is a cross-section through the first differential gear set 321 according to FIG. 3 wherein it is possible to see the differential carrier 311 acting as the web with the rotational journals 322 attached thereto, on which there are held planetary gears 324 so as to be rotatable. The planetary gears 324 of which three are circumferentially distributed roll in the hollow gear 325 on the one hand, and on the sun gear 326 on the other hand. The shaft 327 is connected to the sun gear 326.

FIG. 4B shows the cross-section through the differential gear set 331 according to FIG. 3. In this embodiment, the web is formed by the annular part 334 to which there are attached bearing journals 332 and 333. First planetary gears 335 engaging the hollow gear 325 are supported on the first bearing journals 332. Second planetary gears 336 engaging a sun gear 339 are supported on the second bearing journals 333. The first and second planetary gears 335, 336 engage one another in pairs. A total of three pairs of first and second planetary gears are arranged so as to be distributed around the circumference. The sun gear 339 is connected to a shaft 340.

Figure 5:
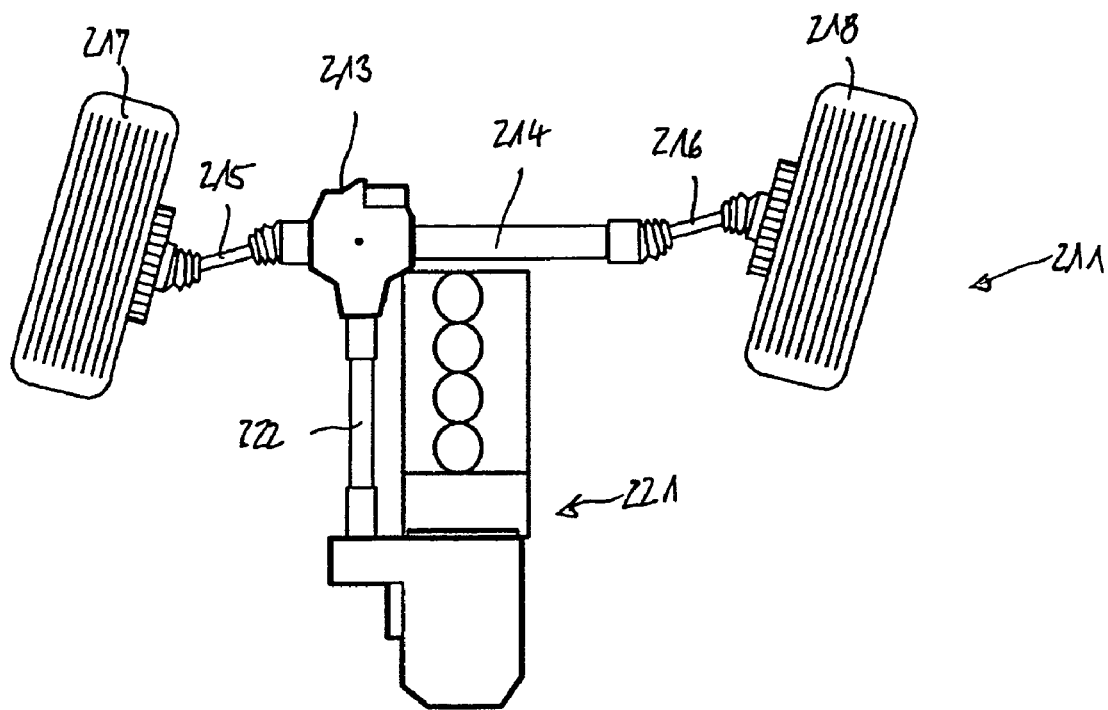
FIG. 5 shows the driveline of an inventive motor vehicle with a driven front axle.
Figure 5:
Figure 5:
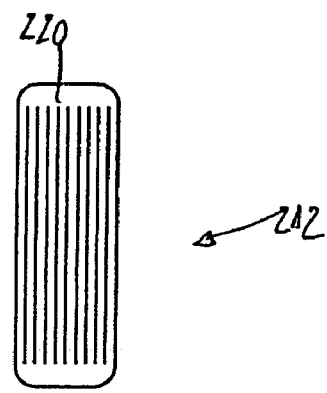

FIG. 5 shows the driveline of a motor vehicle with a driven front axle 211 and a following rear axle 212. It can be seen that the front axle comprises an axle differential 213, an axle tube or carrier 214, two driveshafts 215, 216 and two driving wheels 217, 218. Of the rear axle, only the wheels 219, 220 without the suspension parts are visible. The engine-gearbox unit 221 transmits torque via the propeller shaft 222 to the axle differential 213. Said axle differential is a differential in accordance with the invention, having one input shaft and three output shafts which can be connected to one another via two couplings, so that torque can be freely distributed between the wheels 217 and 218.

Figure 6:
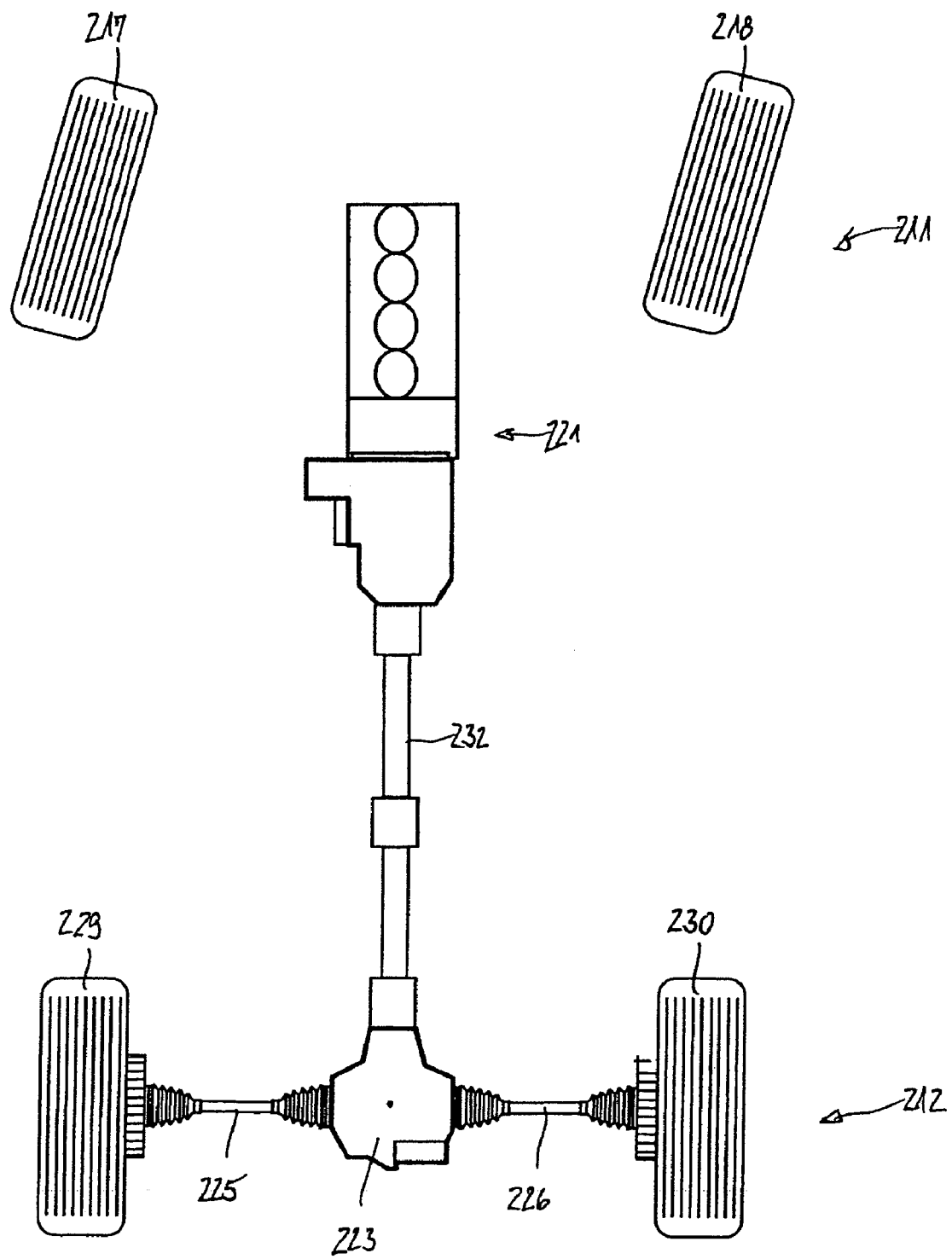
FIG. 6 shows the driveline of an inventive motor vehicle with a driven rear axle.

FIG. 6 shows the driveline of a motor vehicle with a freely running front axle 211 and a driven rear axle 212. Of the front axle 211, only the wheels 217, 218 without the suspension parts are visible. At the rear axle 212, it is possible to identify a differential drive 223, two driveshafts 225, 226 and the driving wheels 229, 230. The engine-gearbox unit 221 drives the input shaft of the axle differential 223 via a multi-part propeller shaft 232. The axle differential 223 is an inventive axle differential with one input shaft and three output shafts which can be coupled to one another by two couplings, so that a controllable amount of torque can be taken from the engine-gearbox unit 221 and distributed in a freely controllable way to the two driving wheels 229, 230.

Figure 7:
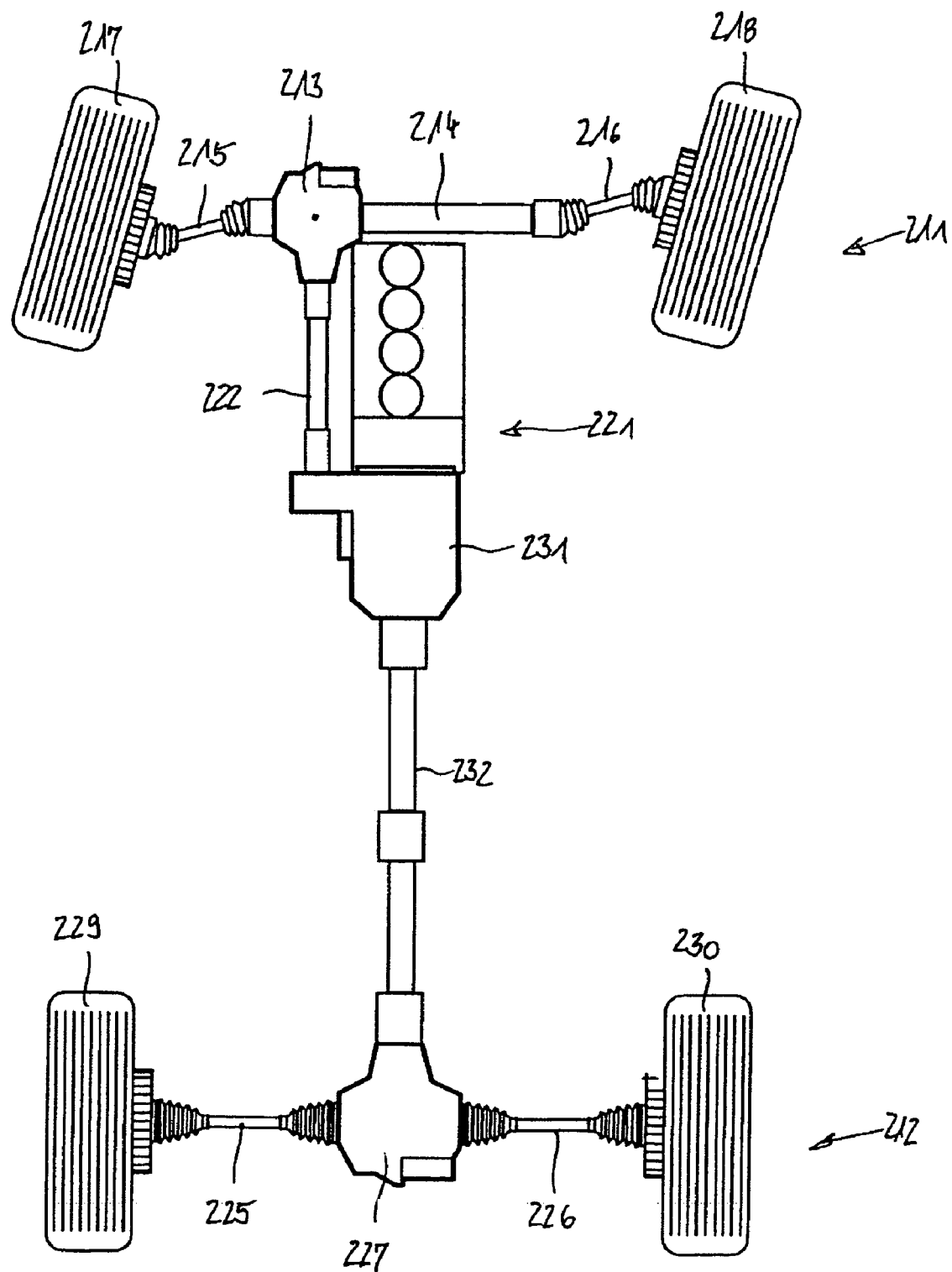
FIG. 7 shows the driveline of an inventive motor vehicle with a primarily driven front axle and a secondary drivable rear axle.

FIG. 7 shows the driveline of a motor vehicle with a primarily driven front axle 211 and a secondarily driven rear axle 212. The front axle can be seen to be provided with an axle differential 213, an axle carrier 214, two driveshafts 215, 216, as well as the driven front wheels 217, 218. It can be seen that the rear axle is provided with an axle differential 227, driveshafts 225, 226 and the secondarily driven driving wheels 229, 230. The engine-gearbox unit comprises a locking or lockable central differential 231 whose input end is connected to the engine-gearbox unit 221 and whose output shafts, on the one hand, via the front propeller shaft 222, drives the front axle differential 213 and, on the other hand, via a multi-part rear propeller shaft 232, the axle differential 227 of the rear axle. In this embodiment, the axle differential 213 of the front axle is an inventive differential drive with one input shaft and three output shafts which can be coupled to one another via two couplings, with two outputs being connected to the driving wheels 217, 218. The rear axle differential 227 is preferably a conventional open differential drive.

Figure 8:
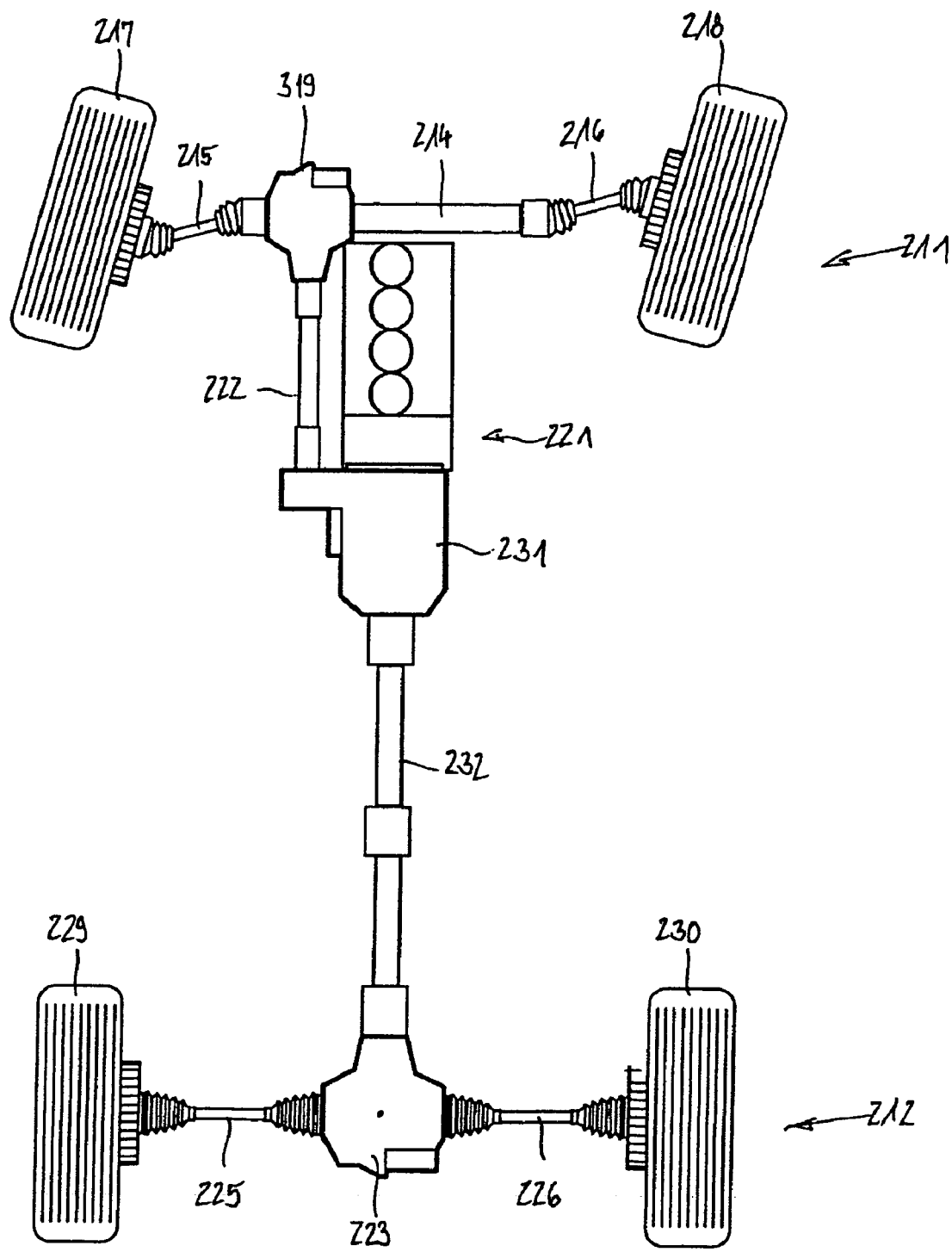
FIG. 8 shows the driveline of inventive motor vehicle with a primarily driven rear axle and a secondarily driven front axle.

FIG. 8 shows the driveline of a motor vehicle with a secondary driven front axle 211 and a primarily driven rear axle 212. The front axle can be seen to be provided with an axle differential 319, an axle carrier 214, two driveshafts 215, 216 as well as the driven front wheels 217, 218. The rear axle comprises an axle differential 223, driveshafts 225, 226 as well as the driven driving wheels 229, 230. The engine-gearbox unit 221 comprises a locking or lockable central differential whose input end is connected to the engine-gearbox unit and whose output shafts, on the one hand, via a front propeller shaft 222, drive the front axle differential 219 and, on the other hand, via a multi-part rear propeller shaft 232, the axle differential 223 of the rear axle. The axle differential 223 of the rear axle is an inventive differential drive with one input shaft and three output shafts which can be coupled to one another by two couplings, with two outputs being connected to the driving wheels 229, 230. The front axle differential 319 is preferably a conventional open differential drive.

Figure 9:
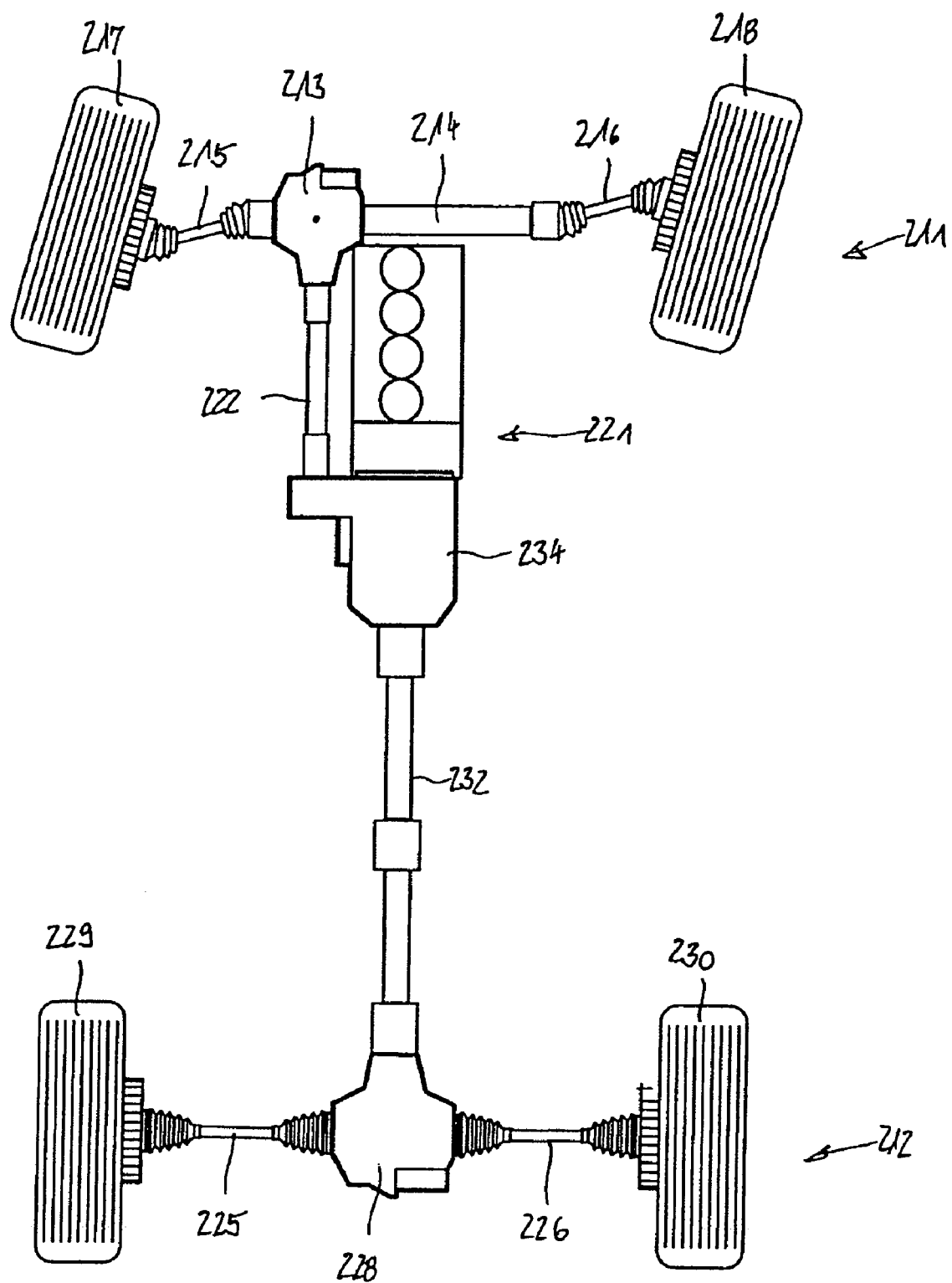
FIG. 9 shows the driveline of an inventive motor vehicle with a primarily driven front axle and a secondarily drivable rear axle.

FIG. 9 shows the driveline of a motor vehicle with a primarily driven front axle 211 and a secondarily driven rear axle 212. The front axle can be seen to be provided with an axle differential 213, an axle carrier 214, two driveshafts 215, 216, as well the driven front wheels 217, 218. The rear axle comprises an axle differential 228, driveshafts 225, 226 as well as the secondarily driven driving wheels 229, 230. The engine-gearbox unit comprises a transfer box 234 with a fixed torque distribution rate, whose input end is connected to the engine-gearbox unit 221 and whose output shafts, on the one hand, via a front propeller shaft 222, drive the front axle differential 213 and, on the other hand, via a multi-part rear propeller shaft 232, the axle differential 228 of the rear axle. The axle differential 213 of the front axle is an inventive differential drive with one input shaft and three output shafts which can be coupled to one another via two couplings, with two outputs being connected to the driving wheels 217, 218. The rear axle differential 228 is a differential drive into which, at the input end, there is integrated a switchable coupling (hang-on coupling).

Figure 10:
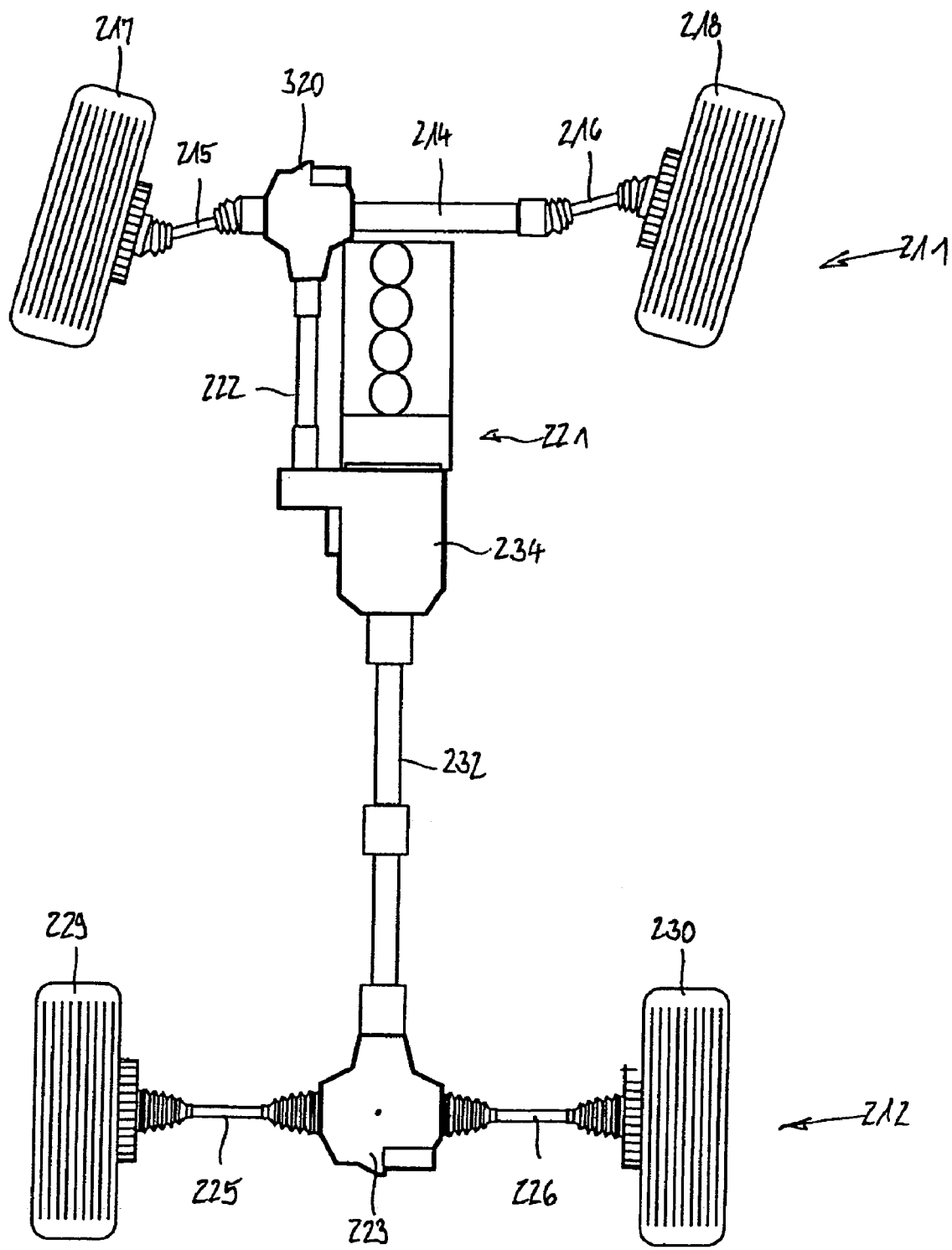
FIG. 10 shows the driveline of an inventive motor vehicle with a primarily driven rear axle and a secondarily drivable front axle.

FIG. 10 shows the driveline of a motor vehicle with a secondarily driven front axle 211 and a primarily driven rear axle 212. The front axle can be seen to be provided with an axle differential 320, an axle carrier 214, two driveshafts 215, 216 as well as with the driven front wheels 217, 218. The rear axle comprises an axle differential 223, driveshafts 225, 226, as well as the driven driving wheels 229, 230. The engine-gearbox unit 221 comprises a transfer box 234 with a fixed torque distribution rate, whose input end is connected to the engine-gearbox unit 221 and whose output shafts, on the one hand, via a front propeller shaft 222, drive the front axle differential 320 and, on the other hand, via a multi-part rear propeller shaft 232, the axle differential 223 of the rear axle. The axle differential 223 of the rear axle is an inventive differential drive with one input shaft and three output shafts which can be coupled to one another by two couplings, with two outputs being connected to the driving wheels 229, 230. The front axle differential 320 is the differential drive into which, at the input end, there is integrated a switchable coupling (hang-on coupling).

Figure 11:
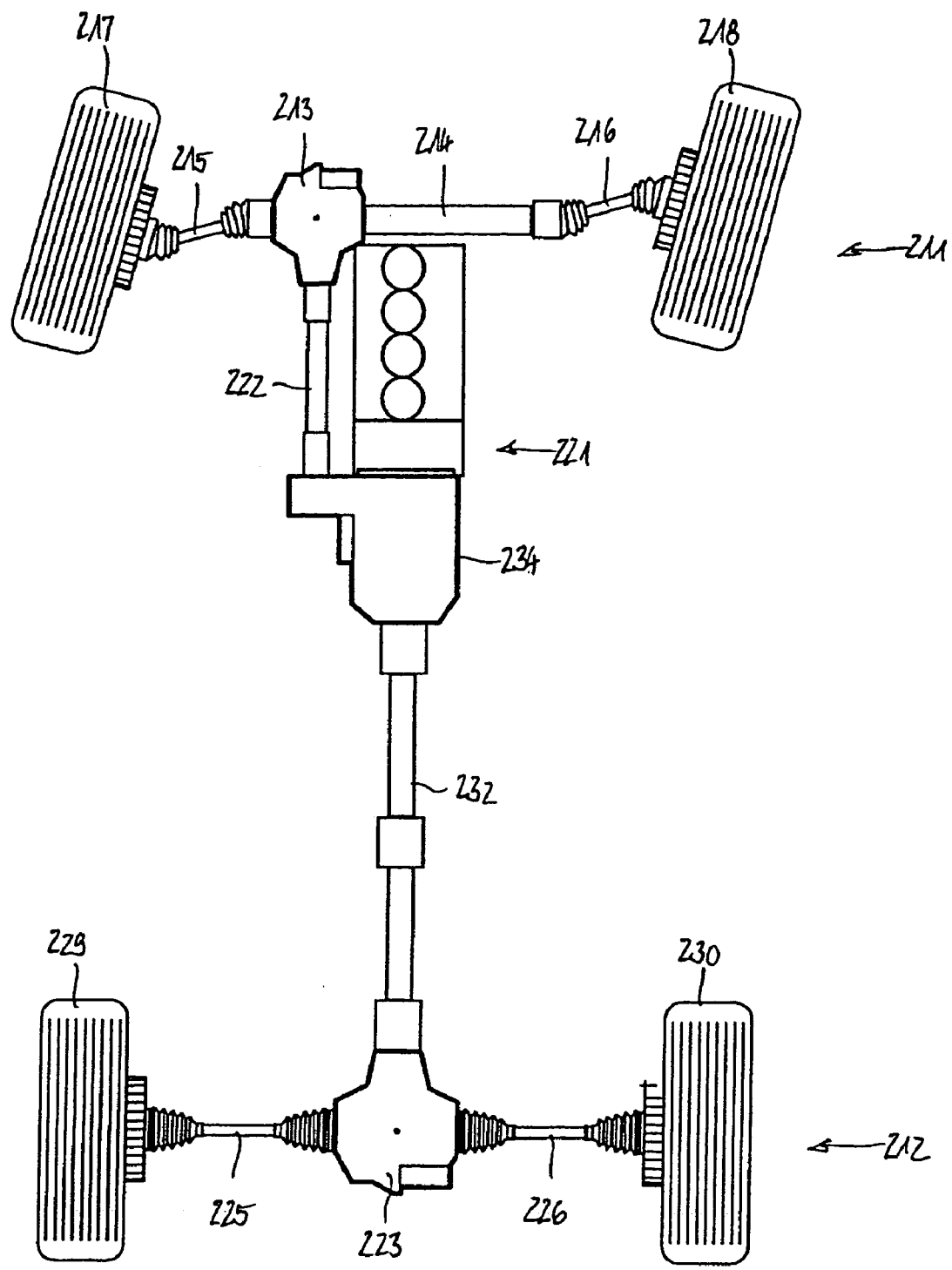
FIG. 11 shows the driveline of an inventive motor vehicle with two driven axles having differentials in accordance with an embodiment of the invention.

FIG. 11 shows the driveline of a motor vehicle with a driven front axle 211 and a driven rear axle 212. The front axle can be seen to be provided with an axle differential 213, an axle carrier 214, two driveshafts 215, 216, as well as the driven front wheels 217, 218. The rear axle comprises an axle differential 223, driveshafts 225, 226, as well as the driven driving wheels 229, 230. The engine-gearbox unit 221 comprises a transfer box 234 with a fixed distribution rate, whose input end is connected to the engine-gearbox unit and whose output shafts, on the one hand, via a front propeller shaft 222, drive the front axle differential and, on the other hand, via a multi-part rear propeller shaft, the axle differential 223 of the rear axle. In this embodiment, the axle differential 213 of the front axle and the axle differential 223 of the rear axle are inventive differential drives each with one input shaft and three output shafts which can be coupled to one another by two couplings, with each two outputs being connected to the driving wheels of the respective axle.

Figure 12:
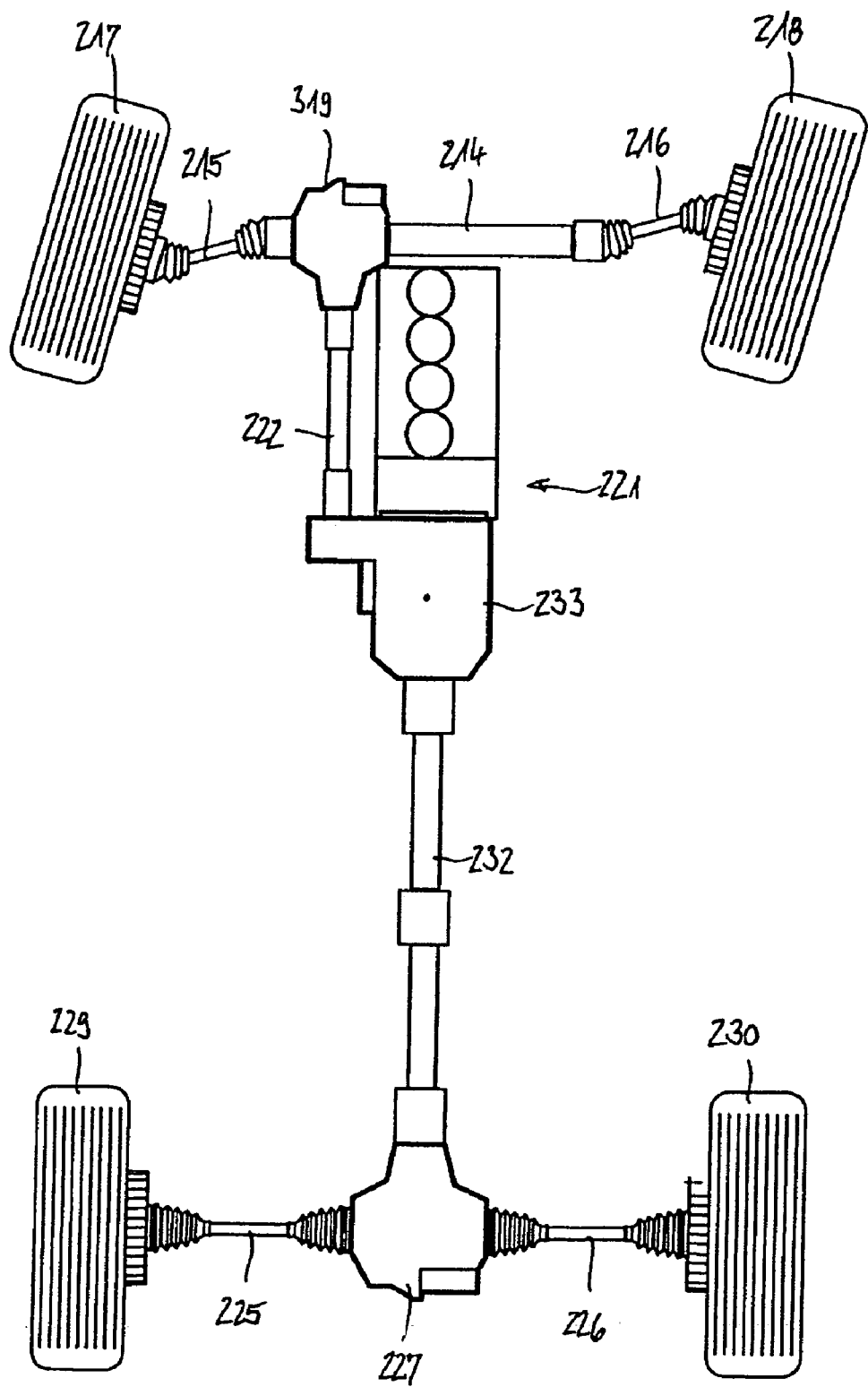
FIG. 12 shows the driveline of an inventive motor vehicle with two driven axles with an inventive central differential.

FIG. 12 shows the driveline of a motor vehicle with a driven front axle 211 and a driven rear axle 212. The front axle can be seen to be provided with an axle differential 319, an axle carrier 214, two driveshafts 215, 216 as well as with the driven front wheels 217, 218. The rear axle comprises an axle differential 227, driveshafts 225, 226, as well as the secondarily driven driving wheels 229, 230. The engine-gearbox unit 221 comprises an inventive differential drive 233 with one input shaft and three output shafts which can be coupled to one another by two couplings, with the input shaft being connected to the engine-gearbox unit 221 which, on the one hand, via a front propeller shaft 222, drives the front axle differential 219 and, on the other hand, via a multi-part rear propeller shaft 232, the axle differential 227 of the rear axle. The axle differentials 319, 227 are preferably conventional open differential drives.

In FIGS. 5 to 12, differential drives in accordance with the invention have each been provided with a centrally positioned point, whereas the drives not provided with a central point, in respect of their function, can be designed in accordance with the state of the art.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A differential drive having an input element (E) and three output elements (A1, A2, A3) which relative to one another comprise a differential effect and wherein there exists a fixed ratio between the input torque introduced via the input element (E) and each of the output torques directly transmittable to the output elements and wherein one of the output elements (A3) can be connected via at least one coupling (K1, K2) to each of the two other output elements (A1, A2); and wherein by varying the individual coupling torques of the couplings (K1, K2), it is possible to vary the input torque introduced via the input element (E) as well as the distribution of the input torque between the first one and the second one of the output elements (A1, A2) and, wherein the input torque between the input element (E) and the first output element (A1) is varied separately from the input torque between the input element (E) and the second output element (A2).

2. A differential drive according to claim 1, wherein the couplings are controllable couplings which permit a variable distribution of the output torque of the third output element (A3) to the two other output elements (A1, A2).

3. A motor vehicle having a driving axle, and a differential drive according to claim 1, wherein an engine-gearbox unit is connected to the first input element of the differential drive which is used as the axle drive of the driving axle.

4. A motor vehicle having two driving axles, and a differential drive according to claim 1, wherein an engine-gearbox unit is connected to an input shaft of a locking central differential whose first output shaft is connected to a first driven axle and whose second output shaft is connected to a second driven axle, wherein the differential drive is the axle differential of the first driven axle.

5. A motor vehicle according to claim 4, wherein the front axle is a primarily driven axle and the rear axle is a secondarily driven axle.

6. A motor vehicle having two driving axles, and a differential drive according to claim 1, wherein an engine-gearbox unit is connected to an input shaft of a transfer box whose first output shaft is connected to a primarily driven axle and whose second output shaft is connected via a switchable coupling to a secondarily driven axle, and wherein the differential drive is used as the axle differential of at least one of the two driven axles.

7. A motor vehicle according to claim 6, wherein the primarily driven axle is the front axle and the secondarily driven axle the rear axle.

8. A motor vehicle having two driving axles, and a differential drive according to claim 1, wherein an engine-gearbox unit is connected to an input shaft of a transfer box whose output shafts are connected to one another in a rotationally rigid way and whose first output shaft is connected to a first driven axle and whose second output shaft is connected to a second driven axle, wherein the differential drive is used as the axle differential of the first driven axle and wherein an identical differential drive is used as the axle drive of the second driven axle.

9. A motor vehicle having two driving axles, and a differential drive according to claim 1, wherein an engine-gearbox unit is connected to an input shaft of the differential drive which is used as a central differential and whose first output shaft is connected to a first driven axle and whose second output shaft is connected to a second driven axle, wherein a further differential drive is used as an axle differential in the first driven axle and as an axle differential in the second driven axle.

10. A differential drive comprising:
a differential carrier which is rotatably supported and which is rotatingly drivable;
a first differential drive set comprising a first input element, a first outlet part of the first set forming a first output part (A1), and a second outlet part of the first set;
a second differential drive set comprising a second input element forming the second outlet part of the first set, a first outlet part of the second set forming a second output part (A2), and a second outlet part of the second set constituting a third output part (A3);
a first controllable coupling effective between the first output part (A1) and the third output part (A3);
a second controllable coupling effective between the second output part (A2) and the third output part (A3).

11. A differential drive according to claim 10 wherein the first differential drive set is a planetary drive wherein the differential carrier forms a web on which planetary gears are rotatably supported, wherein there is provided a hollow gear and wherein a sun gear forms the first output part (A1).

12. A differential drive according to claim 11 wherein the first output part (A1) is a hollow shaft in which there runs a shaft which is connected to the third output part (A3).

13. A differential drive according to claim 12 wherein the second differential drive set is a planetary drive wherein there is provided a hollow gear, wherein the third output part (A3) forms the web on which planetary gears are rotatably supported and wherein the sun gear is firmly connected to the second output part (A2).

14. A differential drive according to claim 11 wherein the second differential drive set is a planetary drive wherein there is provided a hollow gear, wherein the third output part (A3) forms the web on which planetary gears are rotatably supported and wherein the sun gear is firmly connected to the second output part (A2).

15. A differential drive according to claim 11 wherein the second differential drive set is a double planetary drive wherein first planetary gears engage the hollow gear and second planetary gears engage the sun gear, and wherein first and second planetary gears engage each other's teeth.

16. A differential drive according to claim 10 wherein the second differential drive set is a planetary drive wherein there is provided a hollow gear, wherein the third output part (A3) forms a web on which planetary gears are rotatably supported and wherein a sun gear is firmly connected to the second output part (A2).

17. A differential gear according to claim 16 wherein the web of the second planetary drive unit is connected to a hollow shaft in which there runs the second output part (A2).

18. A differential drive according to claim 16 wherein the second differential drive set is a double planetary drive wherein first planetary gears engage the hollow gear and second planetary gears engage the sun gear, and wherein first and second planetary gears engage each other's teeth.

19. A differential drive according to claim 10 wherein the second differential drive set is a double planetary drive wherein first planetary gears engage a hollow gear and second planetary gears engage a sun gear, and wherein first and second planetary gears engage each other's teeth.

20. A differential drive according to claim 10 wherein the two controllable couplings are positioned outside the differential carrier.

21. A differential drive according to claim 20, wherein a setting device for at least one controllable coupling is a ball-ramp setting device.

22. A differential drive according to claim 10 wherein at least one of the controllable couplings is positioned inside the differential carrier.

23. A differential drive according to claim 22, wherein a setting device for at least one controllable coupling is a ball-ramp setting device.

24. A differential drive according to claim 10 wherein a setting device for at least one controllable coupling is a ball-ramp setting device.

25. A motor vehicle having a driving axle, and a differential drive according to claim 10, wherein an engine-gearbox unit is connected to the first input element of the differential drive which is used as the axle drive of the driving axle.

26. A motor vehicle having two driving axles, and a differential drive according to claim 10 wherein an engine-gearbox unit is connected to an input shaft of a locking central differential whose first output shaft is connected to a first driven axle and whose second output shaft is connected to a second driven axle, wherein the differential drive is the axle differential of the first driven axle.

27. A motor vehicle having two driving axles, and a differential drive according to claim 10, wherein an engine-gearbox unit is connected to an input shaft of a transfer box whose first output shaft is connected to a primarily driven axle and whose second output shaft is connected via a switchable coupling to a secondarily driven axle, and wherein the differential drive is used as the axle differential of at least one of the two driven axles.

28. A motor vehicle having two driving axles, and a differential drive according to claim 10, wherein an engine-gearbox unit is connected to an input shaft of a transfer box whose output shafts are connected to one another in a rotationally rigid way and whose first output shaft is connected to a first driven axle and whose second output shaft is connected to a second driven axle, wherein the differential drive is used as the axle differential of the first driven axle and wherein an identical differential drive is used as the axle drive of the second driven axle.

29. A motor vehicle having two driving axles, and a differential drive according to claim 10, wherein an engine-gearbox unit is connected to an input shaft of the differential drive which is used as a central differential and whose first output shaft is connected to a first driven axle and whose second output shaft is connected to a second driven axle, wherein a further differential drive is used as an axle differential in the first driven axle and as an axle differential in the second driven axle.

* * * * *